US006363632B1

(12) United States Patent
Stentz et al.

(10) Patent No.: US 6,363,632 B1
(45) Date of Patent: Apr. 2, 2002

(54) SYSTEM FOR AUTONOMOUS EXCAVATION AND TRUCK LOADING

(75) Inventors: Anthony Stentz, Pittsburgh; John Bares, Wexford; Sanjiv Singh, Pittsburgh; Patrick Rowe, Pittsburgh; Patrick C. Leger, Pittsburgh, all of PA (US); Norman Keith Lay, Dunlap, IL (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/392,935

(22) Filed: Sep. 9, 1999

Related U.S. Application Data
(60) Provisional application No. 60/103,735, filed on Oct. 9, 1998.

(51) Int. Cl.[7] .................................................. E02F 3/04
(52) U.S. Cl. ............................. 37/414; 37/348; 701/50
(58) Field of Search ........................... 37/343, 382, 414, 37/195; 701/50; 172/2, 3, 4.5, 5, 6; 414/699

(56) References Cited

U.S. PATENT DOCUMENTS

| | | | | |
|---|---|---|---|---|
| 5,404,661 A | * | 4/1995 | Sahm et al. | 37/348 |
| 5,438,771 A | * | 8/1995 | Sahm et al. | 37/348 |
| 5,477,459 A | * | 12/1995 | Clegg et al. | 701/50 |
| 5,546,093 A | * | 8/1996 | Gudat et al. | 37/414 X |
| 5,666,792 A | * | 9/1997 | Mullins | 56/10.2 A |
| 5,735,352 A | * | 4/1998 | Henderson et al. | 172/4.5 |
| 5,752,207 A | * | 5/1998 | Sarangapani | 701/26 |

(List continued on next page.)

FOREIGN PATENT DOCUMENTS

JP       10-88625      4/1998

OTHER PUBLICATIONS

Stentz et al., A Robotic Excavator for Autonomous Truck Loading, International Conference on Intelligent Robotic Systems, Oct. 1998, Victoria, B.C., Canada.

Leger et al., Obstacle Detection and Safeguarding for a High–speed Autonomous Hydraulic Excavator, Proceedings of SPIE vol. 3525, Boston, MA 1998.

Herman et al., First Results in Autonomous Mapping and Retrieval of Buried Objects, Elsevier, 1995.

Sanjiv Singh, The State of the Art in Automation of Earthmoving, In ASCE Journal of Aerospace Engineering, vol. 10, #4, Oct. 1997.

*Primary Examiner*—Victor Batson
(74) *Attorney, Agent, or Firm*—Blackwell Sanders Peper Martin

(57) ABSTRACT

In accordance with the present invention, a system to organize and coordinate components associated with earthmoving machinery capable of performing excavating and loading tasks autonomously is disclosed. The system comprises an earthmoving machine equipped with a scanning sensor system operable to provide data regarding regions within an earthmoving environment including an excavation region and a loading region and a planning and control module operable to receive data from the scanning sensor system to plan a task associated with the control of the earthmoving machine while concurrently performing another task associated with control of the earthmoving machine. Any number and type of sensor systems, such as a laser rangefinder or a radar rangefinder, may be incorporated in the system depending on requirements and the capabilities of the system. The sensor systems have independently controllable fields of view, with each sensor system being capable of providing data pertaining to a different portion of the earthmoving environment.

22 Claims, 8 Drawing Sheets

U.S. PATENT DOCUMENTS

| | | | | |
|---|---|---|---|---|
| 5,764,511 A | * | 6/1998 | Henderson | 364/167.01 |
| 5,908,458 A | * | 6/1999 | Rowe et al. | 701/50 |
| 5,918,582 A | * | 7/1999 | Fan et al. | 172/2 |
| 5,935,183 A | * | 8/1999 | Sahm et al. | 701/50 |
| 5,964,298 A | * | 10/1999 | Greensun | 172/4.5 |
| 5,996,702 A | * | 12/1999 | Hall | 172/4.5 |
| 6,047,227 A | * | 4/2000 | Henderson et al. | 701/50 |
| 6,058,344 A | * | 5/2000 | Rowe et al. | 701/50 |
| 6,068,060 A | * | 5/2000 | Ohtomo et al. | 172/4.5 |
| 6,076,030 A | * | 6/2000 | Rowe | 701/50 |
| 6,108,949 A | * | 8/2000 | Singh et al. | 37/414 |
| 6,114,993 A | * | 9/2000 | Henderson et al. | 37/414 X |

* cited by examiner

SYSTEM FOR AUTONOMOUS EXCAVATION AND TRUCK LOADING

This application is based upon and claims priority through provisional patent application Ser. No. 60/103,735, filed Oct. 9, 1998.

TECHNICAL FIELD

This invention relates generally to a system for autonomous excavation and, more particularly, to a system for performing excavation and loading tasks with an autonomous excavating machine.

BACKGROUND FIELD

Machines such as excavators, backhoes, front shovels, and the like are used for earthmoving work and operations. These earthmoving machines typically have work implements which consist of boom, stick, and bucket linkages. The boom is pivotally attached to the excavating machine at one end and to its other end is pivotally attached a stick. The bucket is in turn pivotally attached to a free end of the stick. Each work implement linkage is controllably actuated by at least one hydraulic cylinder for movement in a vertical plane. An operator manipulates the work implement to perform a sequence of distinct functions which constitute a complete earthmoving cycle within an earthmoving operation.

One type of machine commonly found at an earthmoving site is an excavator that is positioned above a pile of material to be removed. In a typical work cycle of an excavator, the operator uses prior experience to determine an optimal location to excavate and positions the work implement at the determined location. The operator then lowers the work implement downward until the bucket penetrates the soil and executes a digging stroke which brings the bucket toward the excavating machine. The operator subsequently curls the bucket to capture the soil. To dump the captured load the operator raises the work implement, swings it transversely to a specified dump location, such as a dump truck, determines the optimal location to place the load for the desired distribution within the dump location, and releases the soil by extending the stick and uncurling the bucket. The work implement is then returned to the trench location to repeat the work cycle.

Another type of machine commonly found at an earthmoving site is a front-end loader that is often positioned facing a pile of material to be removed. A typical work cycle for a front-end loader differs somewhat from the work cycle for an excavator. With a front-end loader, the operator first determines an optimal location for removing material from the pile and lowers the bucket of the work implement to the ground before moving toward the selected location. The operator penetrates the material with the bucket and executes a digging stroke which raises the bucket upward through the material. The operator subsequently raises the work implement and tilts the bucket toward the loader to capture the material. To dump the captured load, the operator reverses the machine away from pile, determines the location for unloading the material, moves forward to the selected dump location, and releases the soil by tilting the bucket downward. The work implement is then reversed from the loading receptacle and returns to the pile of material to begin the work cycle again.

There is an increasing demand in the earthmoving industry to automate the work cycle of an excavating machine for several reasons. Unlike a human operator, an automated excavating machine remains consistently productive regardless of environmental conditions and prolonged work hours. Automated or autonomous earthmoving machines are ideal for applications where conditions are unsuitable or undesirable for humans. An automated machine also enables more accurate excavation and compensates for lack of operator skill or experience.

The major components for automating excavation include such steps as digging material, loading material into loading receptacles, and recognizing loading point positions and orientations throughout the excavation process. A system is needed to consolidate and coordinate the numerous components and tasks required for autonomous earthmoving machines in order for such machines to operate as efficiently as possible. This may be accomplished using a sensor system capable of providing up-to-date data pertaining to different portions or locations within the earthmoving environment. The system should include such components as a planning and control module implemented on a computer that uses the up-to-date data to concurrently plan and execute one or more portions or steps of the earthmoving task. It is also desirable for the system to use the sensor data to detect mobile and stationary obstacles in the earthmoving environment to allow adequate time for the various planning and executing components to respond accordingly. Further, it is desirable for the planning and control module to incorporate heuristics from expert operators in determining and performing an excavation strategy.

Accordingly, the present invention is directed to overcoming one or more of the problems as set forth above.

DISCLOSURE OF THE INVENTION

In accordance with the present invention, a system for autonomous control of an earthmoving machine within an earthmoving environment comprises an earthmoving machine equipped with a scanning sensor system operable to provide data regarding regions within an earthmoving environment including an excavation region and a loading region and a planning and control module operable to receive data from the scanning sensor system to plan a task associated with the control of the earthmoving machine while concurrently performing another task associated with control of the earthmoving machine.

Another form of the present invention is a system for autonomous control of an earthmoving machine with the system comprising an earthmoving machine equipped with a scanning sensor system operable to provide data corresponding to regions within an earthmoving environment including an excavation region and a loading region, a planning and control module operable to receive data from the scanning sensor system to plan a task associated with the control of the earthmoving machine in the excavation region while concurrently performing another task associated with control of the earthmoving machine within the loading region, and an obstacle detector for detecting the presence of an obstacle within the earthmoving environment and for generating a signal to halt operation of the earthmoving machine once the obstacle has been detected.

In another form of the present invention a system for autonomous control of earthmoving machinery is disclosed which comprises an earthmoving machine equipped with a scanning sensor system operable to provide data corresponding to regions within an earthmoving environment including an excavation region and a loading region, the scanning sensor system comprising a first sensor being operable to rotate to scan a field of view greater than zero degrees in a first plane around the earthmoving machine and a second sensor being operable to rotate to scan a field of view greater than zero degrees in a second plane around the earthmoving machine, the sensors being positioned on the earthmoving machine and having independently adjustable fields of view and scan patterns to provide range data for different areas of the earthmoving environment for planning and executing at least one earthmoving task and an obstacle detector operable to receive data from the scanning sensor system to determine if an object is present within the earthmoving environment and once an obstacle has been detected for halting operation of the earthmoving machine.

BEST MODE FOR CARRYING OUT THE INVENTION

Figure 1:
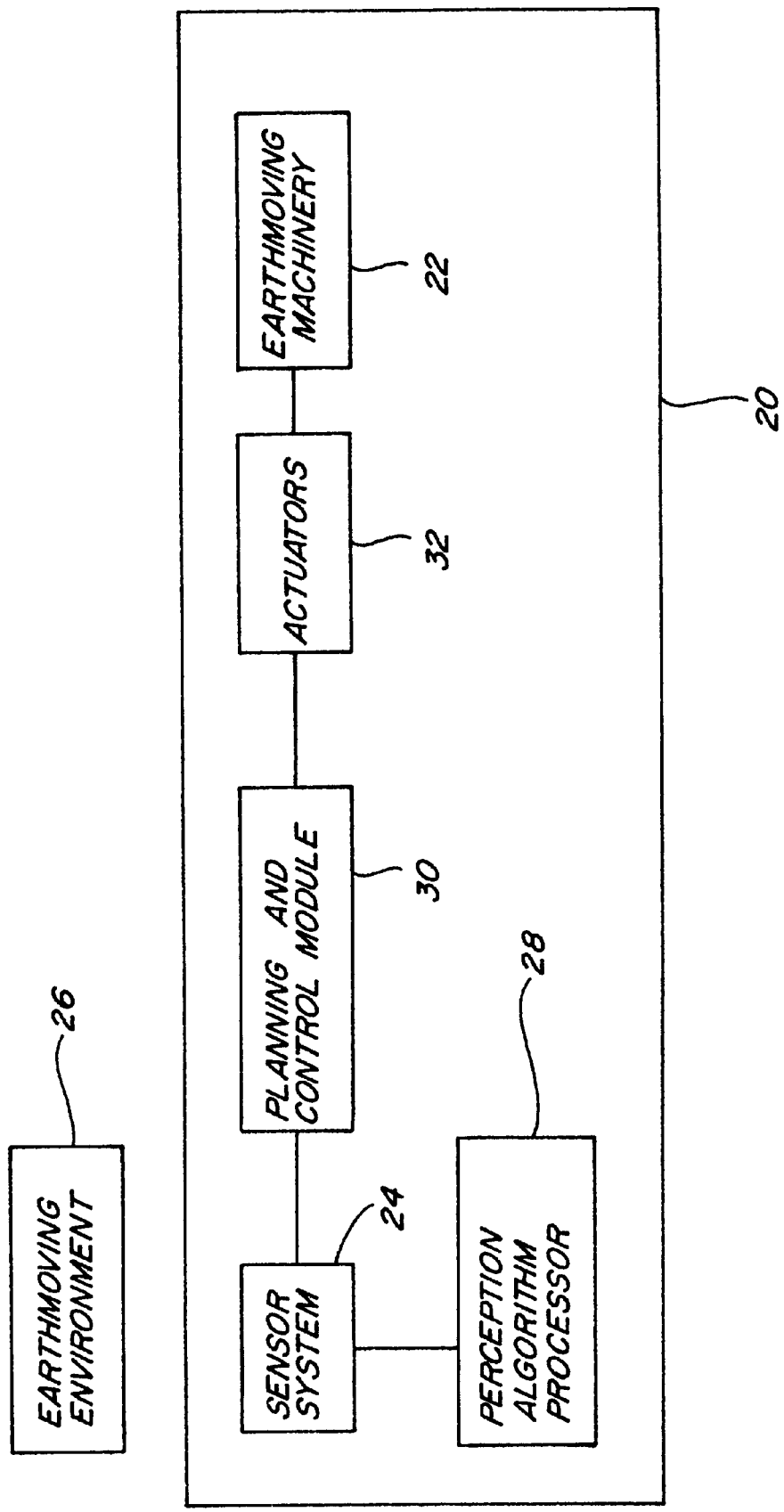
FIG. 1 is a functional block diagram of an autonomous excavation system constructed according to the present invention.

Referring to the drawings, FIG. 1 shows a functional block diagram of a preferred embodiment of an autonomous excavation system 20 for autonomous control of earthmoving machinery 22 according to the present invention. The system 20 has a sensor system 24 which provides perceptual information regarding the earthmoving machinery 22 within an earthmoving environment 26 with such information including the position and velocities of the earthmoving machinery 22 and its associated movable components, the area to be excavated, the object or location in which to place the excavated material, and stationary and mobile obstacles in the earthmoving environment 26. The sensor system 24 is connected to a perception algorithm processor 28 which processes the perceptual information which is provided from the sensor system 24. The perception algorithm processor 28 also provides the processed perceptual information to the sensor system 24. Also connected to the sensor system 24 is a planning and control module 30 which uses the output or result from the perceptual algorithm processor 28 to determine an excavation strategy including where to excavate, where to load excavated materials, and how to move the earthmoving machinery 22 during an excavation operation. The planning and control module 30 is connected to one or more actuators 32 which are part of the earthmoving machinery 22. The actuators 32 are used to control movement of the earthmoving machinery 22 and various components or implements thereof. The planning and control module 30 provides commands to the actuators 32 to control movement of the earthmoving machinery 22 and its associated movable components during the excavation. Preferred embodiments of the sensor system 24 and the planning and control module 30 are discussed in more detail hereinbelow.

Figure 2:
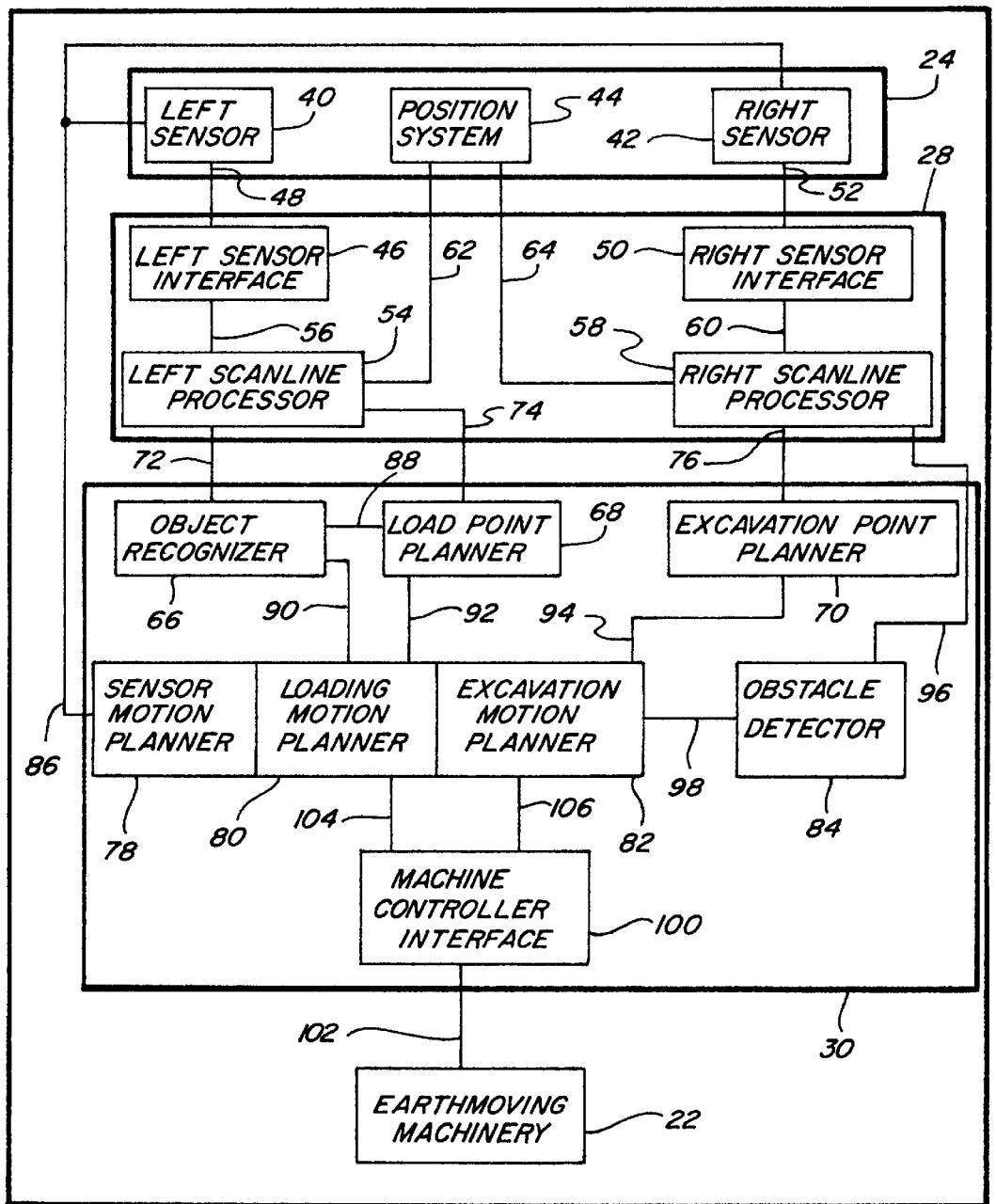
FIG. 2 is a further detailed block diagram of an autonomous excavation system constructed according to the present invention.

FIG. 2 shows a detailed functional block diagram of some of the important components of the system 20 including the sensor system 24, the perception algorithm processor 28, and the planning and control module 30. In particular, the sensor system 24 includes a left sensor 40, a right sensor 42, and a position system 44. In the preferred embodiment the left sensor 40 and the right sensor 42 are scanning laser rangefinding sensors that are mounted at locations on the earthmoving machinery 22 and/or in the earthmoving environment 26 to provide range data or information for desired areas of the earthmoving environment 26. Both the left sensor 40 and the right sensor 42 have a field of view with each field being capable of being controlled independently and/or cooperatively to provide full coverage of the earthmoving environment 26 and to facilitate concurrent planning and execution of earthmoving tasks.

The left sensor 40 provides data to a left sensor interface 46 via a connection 48 with the left sensor interface 46 being a component in the perception algorithm processor 28. The right sensor 42 also provides data to a right sensor interface 50 over a connection 52. The left sensor interface 46 is connected to a left scanline processor 54 and data from the left sensor interface 46 is provided to the left scanline processor 54 over a connection 56. Additionally, the right sensor interface 50 is connected to a right scanline processor 68 with data from the right sensor interface 50 being provided via a connection 60. The scanline processors 54 and 58 convert data received from the sensor interfaces 46 and 50 from spherical coordinates into Cartesian coordinates using corresponding data provided from the position system 44. This information which may take the form of three-dimensional range points may be made available to other components within the system 20 for further use or processing. The scanline processors 54 and 58 are connected to the position system 44 over the leads 62 and 64, respectively.

The planning and control module 30 is shown to include an object recognizer 66, a load point planner 68, and an excavation point planner 70. Information from the left scanline processor 54 is provided to both the object recognizer 66 over a wire 72 and to the load point planner 68 over a wire 74. The object recognizer 66 is capable of recognizing an object, such as a truck, and is also capable of measuring the object's dimensions and location. Also, data from the right scanline processor 58 is sent to the excavation point planner 70 via a connection 76. The planning and control module 30 is shown to further include a sensor motion planner 78, a loading motion planner 80, an excavation planner 82, and an obstacle detector 84 which are shown connected together in that data or information may be shared between the planners 78, 80, and 82. The sensor motion planner 78 is connected to the sensors 40 and 42 by a lead 86. The object recognizer 66 provides information to both the load point planner 68 and the loading motion planner 80 over connections 88 and 90, respectively. Likewise, the load point planner 68 also provides data to the loading motion planner 80 over a connection 92. The excavation point planner 70 is connected to the excavation motion planner 82 by a lead 94. As shown, the obstacle detector 84 receives information from the right scanline processor 58 over via a connection 96. The obstacle detector 84 also receives information from the left scanline processor 54, although such connection is not illustrated. A lead 98 connects the obstacle detector 84 to the excavation motion planner 82 and the obstacle detector 84 may also be connected to the sensor motion planner 78 and the loading motion planner 80, although such connection is not shown.

The load point planner 68 is used to plan a sequence of dump points for loading soil into a truck bed of a truck. The excavation point planner 70 is used to plan a sequence of dig points for eroding a face within the earthmoving environment 26. The loading motion planner 80 controls the dumping of a bucket of soil of the earthmoving machinery 22 into a truck and also controls the return of the earthmoving machinery 22 to dig more soil in the earthmoving environment 26. The excavation motion planner 82 controls the earthmoving machinery 22 during digging at a specific location within the earthmoving environment 26.

The planning and loading module 30 also includes a machine controller interface 100 which is used to communicate commands to the earthmoving machinery 22. The machine controller interface 100 is connected to the earthmoving machinery 22 via a connection 102. The machine controller interface 100 may be connected to the actuators 32 associated with the earthmoving machinery 22 to control operation and movement of the machinery 22.

Each of the planners 68, 70, 78, 80, and 82 within the planning and control module 30 can be implemented in software and run on a separate data processor to emulate the parallelism of the components within the earthmoving machinery 22 and the system 20. Alternatively, two or more of the planners 68, 70, 78, 80, and 82 may be executed in the same data processor. The planning and control module 30 typically comprises software modules that require data regarding the state of the machine 22 and the excavation environment 26 to determine the task that should be performed and the movements to make with the earthmoving machinery 22 to accomplish the required task as efficiently as possible. An overall excavation task, such as "dig a site for a foundation in this location", may be broken down into a series of sub-tasks, some of which are repeated until the overall task is accomplished. The functions performed by the sub-tasks include planning the overall task so that it is conducted efficiently, planning the sub-tasks, recognizing objects in the environment and determining their location and orientation, generating desired excavation shapes and locations, generating control system parameters, and determining desired loading locations. The sub-tasks may also monitor the progress of the task, and make adjustments accordingly if there are unforeseen changes or circumstances.

The position system 44 provides information regarding the position of the earthmoving machine 22 in two-dimensional or three-dimensional space. Several different types of position systems 44 are suitable for use in the present invention including, but not limited to, inertial gyros, lasers, global positioning systems (GPS), GPS/laser combinations, and radar. In certain types of position systems 44, such as GPS systems, a position sensor is remote from the earthmoving machine 22 and a transmitter/receiver is connected to the position sensor to transmit position data to a receiver. The receiver provides data to the planning and control module 30. This data may include three-dimensional position information derived from a GPS sensor system using a phase differential GPS receiver. Such GPS receivers utilize signals generated by global positioning satellites as well as a differential signal from a local base station having a reference receiver of known position coordinates to generate position coordinate data to within known accuracy.

Figure 3:
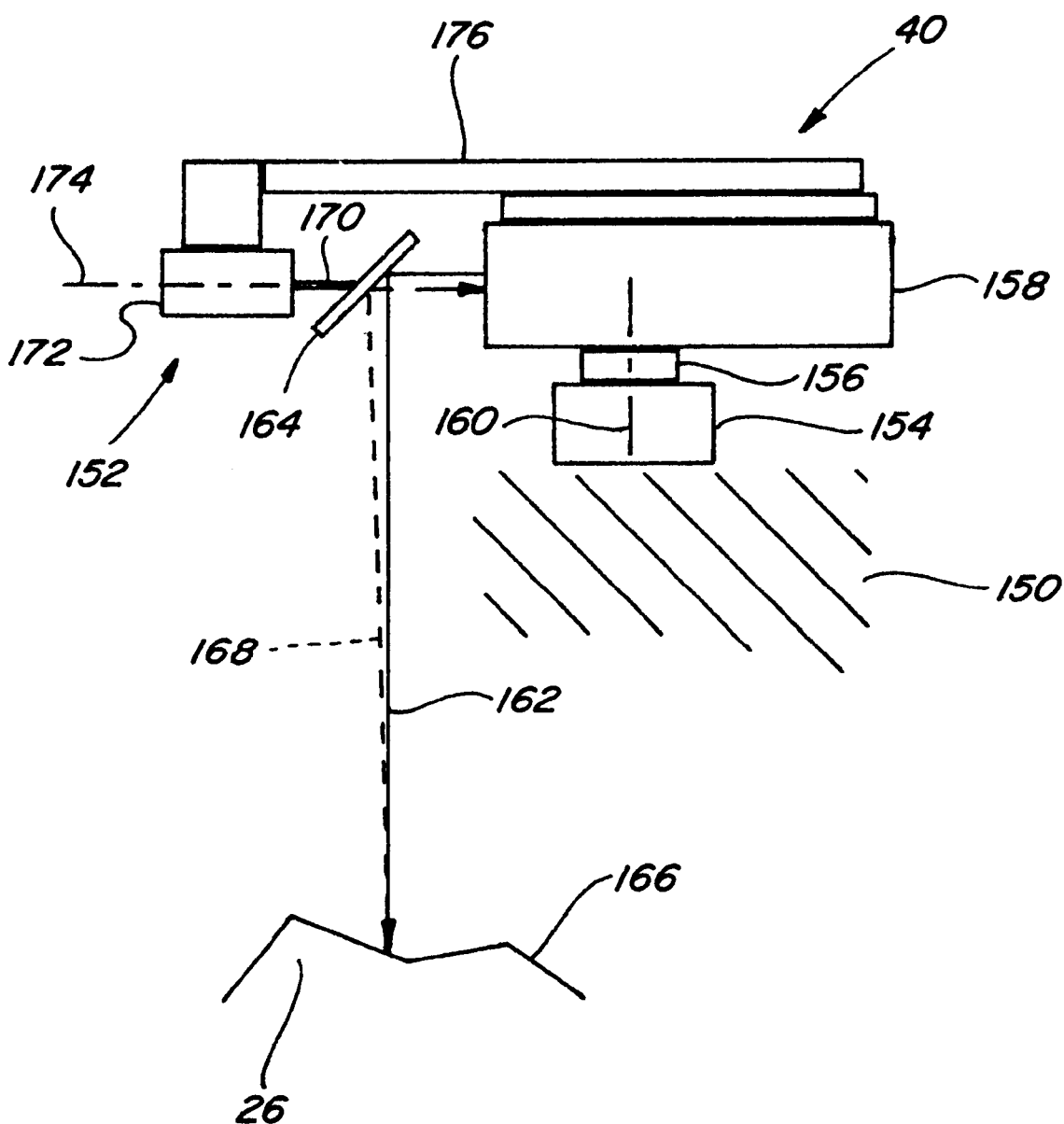
FIG. 3 is a side view of the components of a scanning sensor used with the present invention.

An example of the left sensor system 40 which is part of the sensor system 24 suitable for use in the present invention is illustrated in FIG. 3. The left sensor system 40 is shown mounted on a cutaway portion of a cab 150 of earthmoving machine 22. The left sensor 40 has a panning mechanism or motor 154 which has a shaft 156 connected to a distance measuring sensor 158 which is capable of being rotated about an axis 160. The distance measuring sensor 158 produces or transmits an outgoing signal or beam 162 at a circular mirror or reflector 164 which reflects the beam 162 at terrain 166 within the earthmoving environment 26. A return signal or beam 168 is reflected from the terrain 166 to be further reflected by the mirror 164 back into the distance measuring sensor 158. The mirror 164 is mounted to a shaft 170 of a scanning motor 172 which is capable of rotating the mirror 164 about a scanning axis 174. The scanning motor 172 is connected to an arm 176 which is in turn connected to the distance measuring sensor 158.

The outgoing beam 162 produced by the distance measuring sensor 158 may have such desired performance characteristics which are found in a radar, infrared, laser, or sonar transmitter. A preferred embodiment of such the left sensor system 40 is a scanning laser rangefinder. The left sensor system 40 may have a sample rate of 12 kHz and the motorized mirror 164 is capable of sweeping the outgoing beam 162 circularly in a vertical plane. The panning motor 154 may also pan at a rate of up to 120 degrees per second which enables the beam 162 to be rotated about the azimuth. Environmental factors in the earthmoving environment 26, such as blowing dust or snow, may dictate the suitability of the type of sensor employed. The beam 168 is used by the left sensor system 40 to produce range maps of the earthmoving environment 26 and provides range data corresponding to objects and terrain within the field of view of the left sensor system 40. Additionally, the direction of scanning can be adjusted to provide information about a substantially vertical or horizontal plane depending upon the task and the location of the earthmoving environment 26. Typically, the scanning is conducted vertically and the sensor system 40 may also pan at a slower rate.

The right sensor system 42 is similar in construction and operation as the left sensor system 40. Higher scan rates are possible, depending on the components used and the task requirements. With this information, the earthmoving environment 26 can be constantly monitored for obstacles. Efficient planning and execution of the machine 22 is also facilitated by the left and right sensor systems 40 and 42 having rapid scan rates which provide full field of view information. Each of the sensor's 40 or 42 field of view and scan pattern may also be independently adjusted to provide a more concentrated scan, and therefore more detailed and accurate data for a given area of interest. There are several other types of scanning sensor systems that are suitable for use in the present invention including systems based on radar, laser, infrared, and sonar sensors. A plurality of sensors composed of the same or a combination of different types of sensor systems may be incorporated in the present invention.

Figure 4:
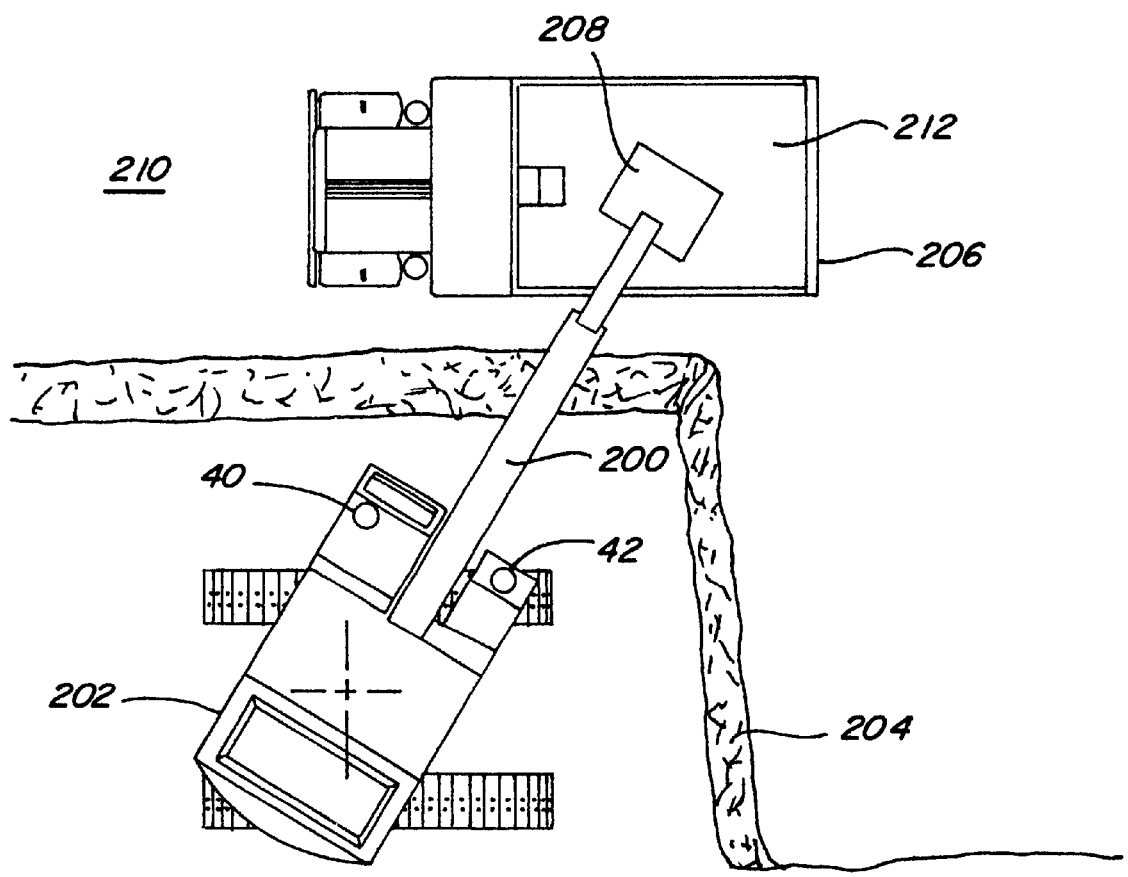
FIG. 4 is a top view of an excavation site with an excavator having incorporated therein the autonomous excavation system of the present invention with the excavator positioned above a dig face and a dump truck located within reach of the excavator's bucket.

With reference now to FIG. 4, the left sensor 40 and the right sensor 42 are shown positioned on either side of a boom 200 on an excavator 202 to sense a dig face 204 and a loading truck 206 positioned near the excavator 202 for receiving excavated materials. During the digging and loading cycle, the planning and control module 30 commands the left and right sensors 40 and 42 to monitor a bucket 208 associated with the boom 200 and an adjacent area 210. As the excavator 202 nears completion of the digging process, the planning and control module 30 commands the left sensor 40 to pan toward the dump truck 206 to check for obstacles in the path of movement of the boom 200 and to determine the position and orientation of the dump truck 206. After completing the loading cycle the scan speed of the sensors 40 and 42 are coordinated with the pivotal rotation of the excavator 202 as it returns the boom 200 toward the dig face 204 to detect obstacles far enough in advance to allow the excavator 202 adequate time to respond or stop.

The planning and control module 30 is also capable of operating the left sensor 40 and the right sensor 42 independently to improve efficiency. For example, as the excavator 202 swings toward the dump truck 206, the right sensor 42 retrogrades (i.e., pans in the opposite direction) to scan the dig face 204 to provide data for planning the next portion of the excavation. At the same time, the left sensor 40 scans the area 210 around the dump truck 206. The sensors 40 and 42 provide current information to the planning and control module 30 which determines an appropriate location 212 within the dump truck 206 to unload the bucket 208, even if the dump truck 206 moved since the last loading cycle. While the bucket 208 is being unloaded, the right sensor 42 scans the area near and to the right of the bucket 208 to prepare for rotating toward the dig face 204. As the excavator 202 rotates to the right, the right sensor 42 pans ahead toward the dig face 204 to collect and provide information for obstacle detection. When the excavator 202 begins to rotate toward the dig face 204 after unloading, the left sensor 40 retrogrades to view the distribution of soil in the dump truck 206 to determine the location in the bed to unload the next bucket of material. As the bucket 208 arrives near the dig face 204, the right sensor 42 scans the dig face 204. Once the left sensor 40 completes its scan of the dump truck 206, the planning and control module 30 commands the left sensor 40 to also scan the dig face 204. The steps in the excavating process are repeated as outlined above until the dump truck 206 is filled or the excavation is completed. The planning and control module 30 uses information provided by the left and the right sensors 40 and 42 to determine whether operations should be halted such as when the dump truck 206 is filled, the excavation is complete, or an obstacle is detected. The information is also used to navigate movement of the earthmoving machinery 22. The perception algorithm processor 28, which is connected to the sensor system 24, receives information from the sensor system 24 and uses this information to recognize objects to derive their location, size, and orientation within the earthmoving environment 26. The sensors 40 and 42 provide range data for a full 360 degrees within the earthmoving environment and such data is updated at a high rate.

Figure 5:
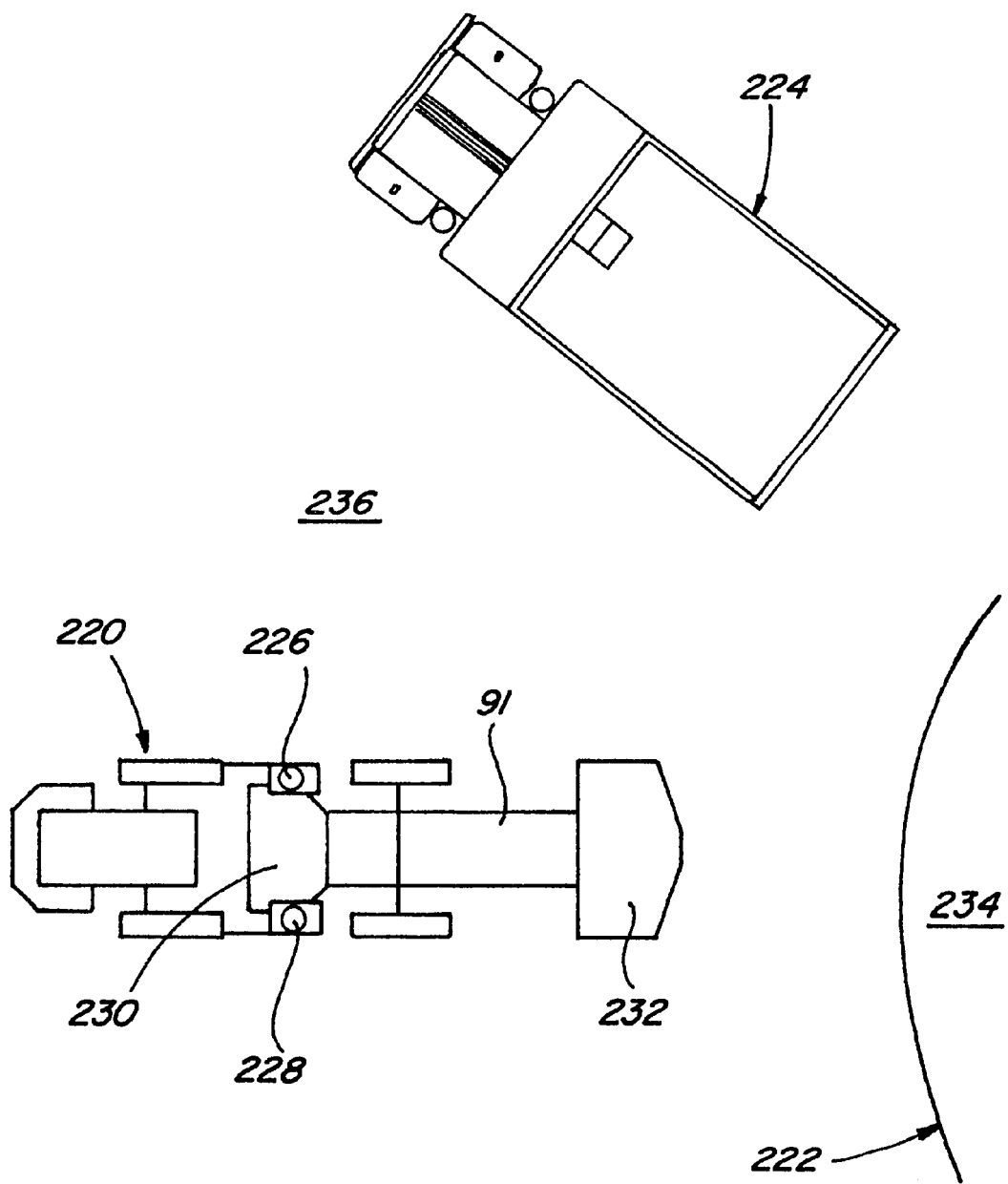
FIG. 5 is a top view of an excavation site with a front-end wheel loader having incorporated therein the autonomous excavation system of the present invention with the front-end wheel loader positioned in front of a dig face and a dump truck positioned along side the front-end wheel loader.

A further application of the present invention employed on other large earthmoving machinery such as a wheel loader 220 is illustrated in FIG. 5. The wheel loader 220 is used for digging into a soil face 222 and unloading into a dump truck 224. A left sensor 226 and a right sensor 228 are mounted on either side of a cab portion 230 of the wheel loader 220. Other sensors (not shown) may be located at the front, rear, side, or other location of the wheel loader 220 or even at a location remote from the wheel loader 220. The role and operation of left sensor 226 and right sensor 228 are generally the same as was described hereinabove for the excavator 202, but with a key difference being that information from the left sensor 226 and the right sensor 228 are also used to navigate the wheel loader 220 during operation thereof. The wheel loader 220 further includes a bucket 232 which is used to scoop soil 234 away from the soil face 222. As the soil 234 is scooped up in the bucket 232, the left and right sensors 226 and 228 monitor the bucket 232 and an adjacent area 236. The area 236 can therefore be monitored for obstacles as well as loading status of the bucket 232. When the bucket 232 is full, information provided from the left and right sensors 226 and 228 is used to monitor the area behind wheel loader 220 as it backs away from or moves toward the soil face 222. As the wheel loader 220 backs up, each sensor 226 and 228 provides information concerning areas to the left and right of the wheel loader 220 so that adequate response time is provided if an object obstructs the path of the wheel loader 220. Once the wheel loader 220 reaches a pivot point it reverses directions, the wheel loader 220 stops as the bucket 232 is raised to full height. During this period, information from the right scanner 228 is used to construct a range map of the soil face 222 that is used to plan the next excavation. When the bucket 232 is fully raised, the left and right sensors 226 and 228 scan either side of the front wheel loader 220 as the wheel loader 220 moves toward or away from the dump truck 224. As the wheel loader 220 approaches the dump truck 224, information from both the left sensor 226 and the right sensor 228 is used to monitor clearance between the wheel loader 220 and the dump truck 224. Once the bucket 232 is unloaded, both the sensors 226 and 228 are again used to scan behind the wheel loader 220 as it backs up to pivot. The left and right sensors 226 and 228 continue to scan the area in front of the wheel loader 220 as it approaches the soil face 222.

Additionally, upon arrival of the dump truck 224, the left sensor 226 is used to scan the dump truck 224 which provides information to determine location and orientation of the dump truck 224. Simultaneously with the digging being conducted by the wheel loader 220 the right sensor 228 is scanning the dump truck 224. Both of the sensors 226 and 228 are used during each approach toward the dump truck 224 so that clearance between the bucket 232 and the dump truck 224 can be computed.

Figure 6:
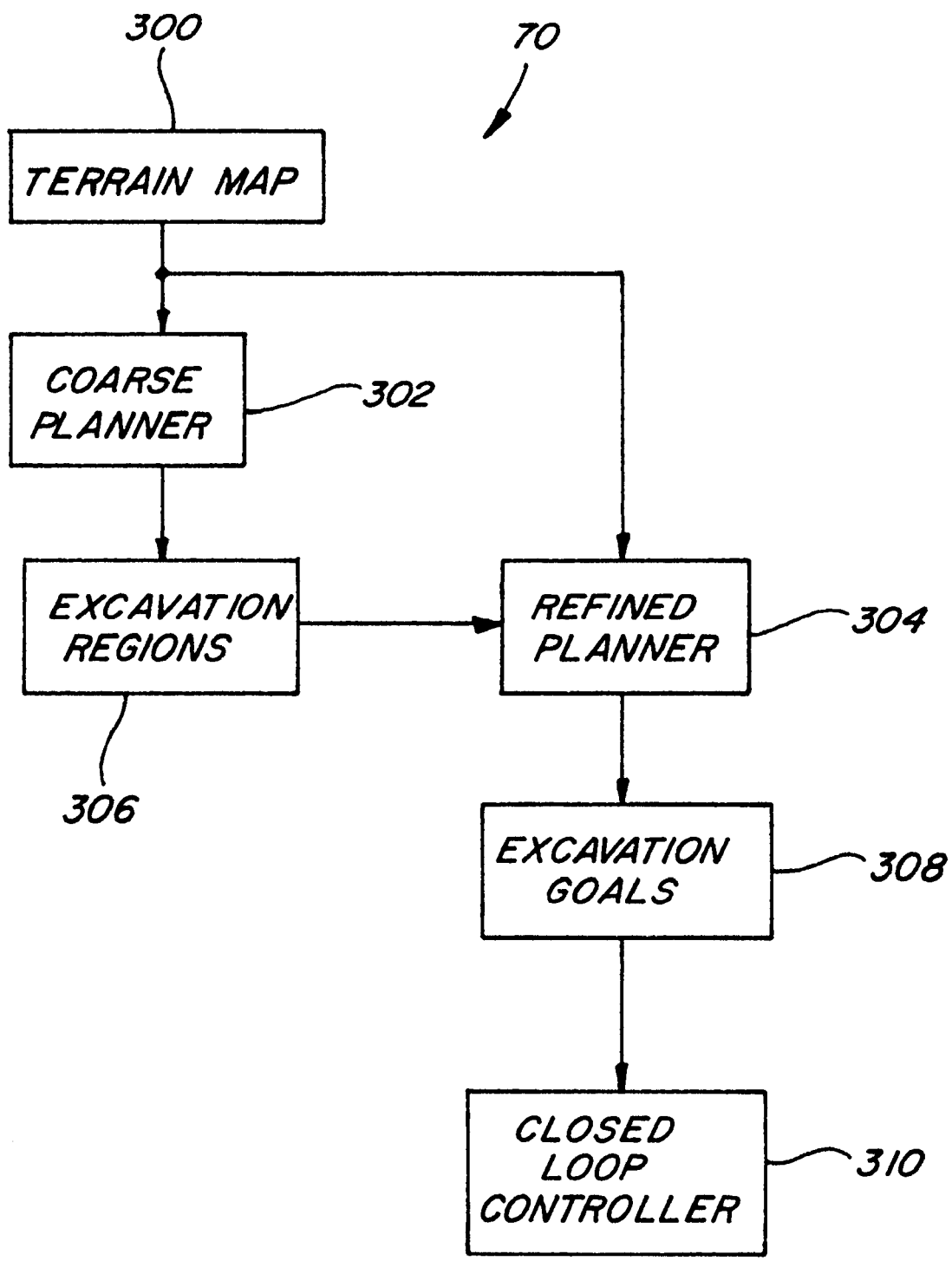
FIG. 6 is a functional block diagram of an excavation point planner which is part of the autonomous excavation system.
Figure 7:
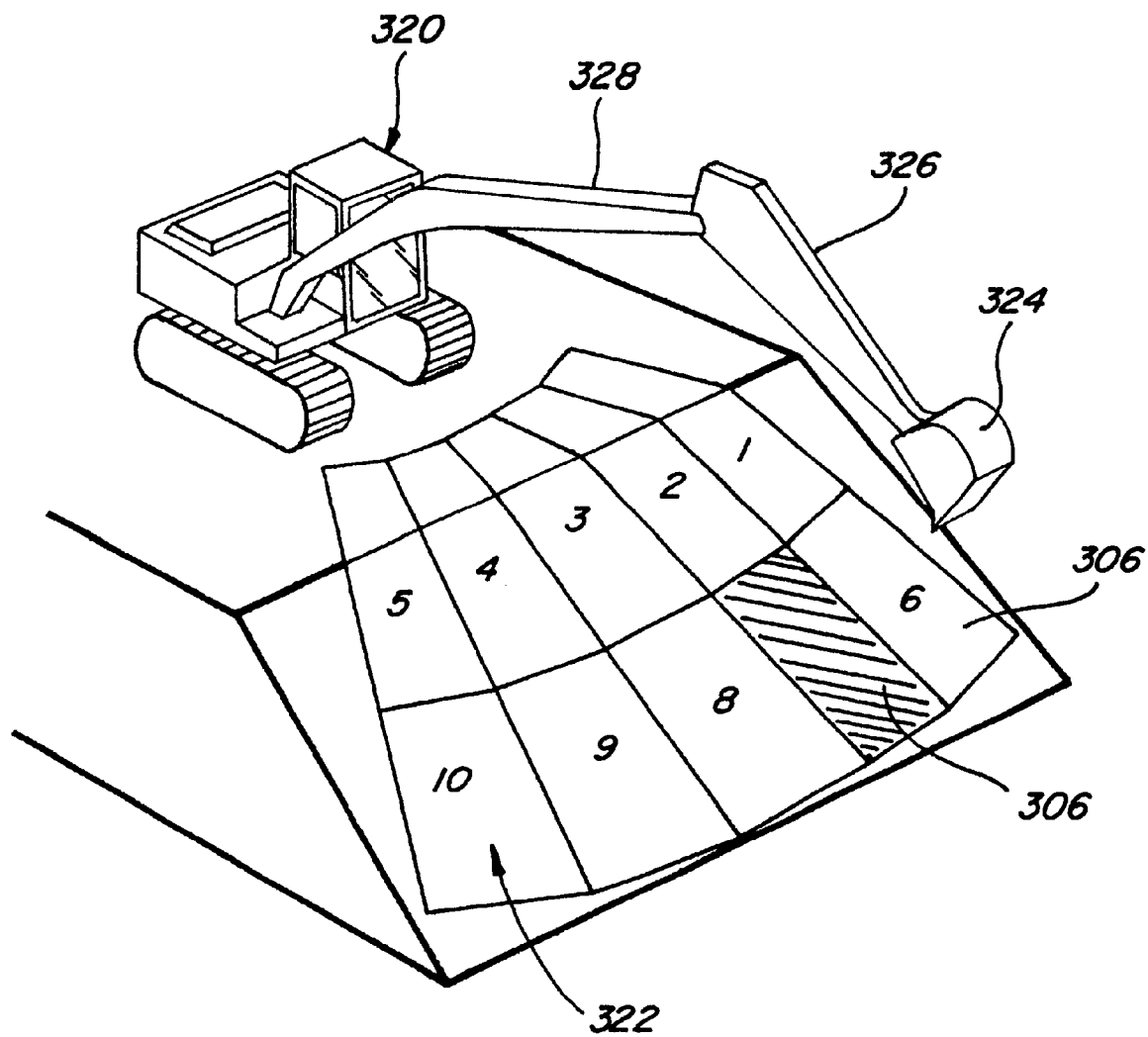
FIG. 7 is a perspective view of an excavation site with an excavator having incorporated therein the autonomous excavator of the present invention with the excavator being positioned above a dig face.

The excavation point planner 70 which plans a sequence of dig points for eroding the shape of the terrain or earthmoving environment 26 is described with reference to both FIGS. 6 and 7. FIG. 6 shows a functional block diagram of a preferred embodiment of the excavation point planner 70 for an excavator 320 which is illustrated in FIG. 7. The excavation point planner 70 develops a terrain map 300 from information or data supplied from the sensor system 24. The terrain map 300 is provided to both a coarse planner 302 and a refined planner 304. The coarse planner 302 uses the information corresponding to the geometry of the terrain and the goal configuration of the terrain to plan a sequence of excavation regions 306. The data representative of the excavation regions 306 is sent to the refined planner 304 which then determines a best excavation goal 308 which can be performed in that region. Finally, the excavation goals 308 are executed by a force and position based closed loop controller 310. The coarse planner 302 ensures even performance over a large number of dig points. The refined planner 304 chooses dig points that meet geometric constraints such as reachability and collisions and which locally optimizes a cost function which includes volume, energy, and time.

A strategy for removing material which was computed by the excavation point planner 70 is illustrated in FIG. 7. In particular, each box 322 indicates an excavation region 306 and the number within each box 322 indicates the order in which each of the regions 306 is provided to the refined planner 304. In this strategy, material is removed from left to right and from the top to the bottom. There are several reasons for this particular strategy. In most cases, the cab portion of the excavator 320 is located on the left hand side of the excavator 320 so that the operator has an unobstructed view of the excavation region 306. By digging from left to right, the excavator 320 does not need to raise its bucket 324, its stick 326, or its boom 328, high to clear material when swinging material to a dump truck. In digging from top to bottom, less force is required from the bucket 324, the stick 326, or the boom 328, because it is not necessary to work against the weight of the material up above.

Figure 8:
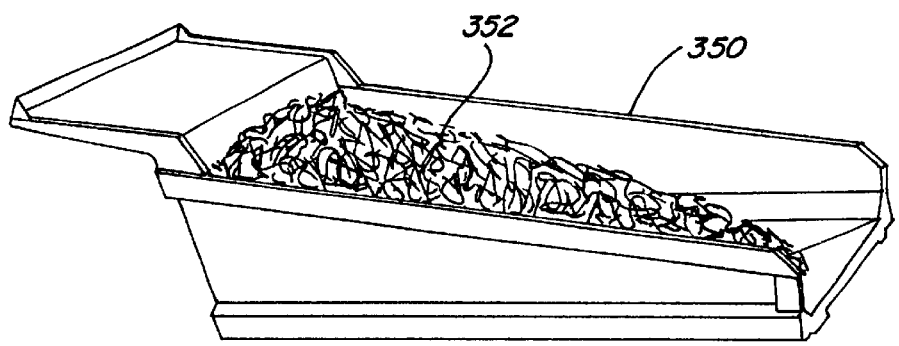
FIG. 8 is a perspective view of a bed of a dump truck filled with soil.
Figure 9:
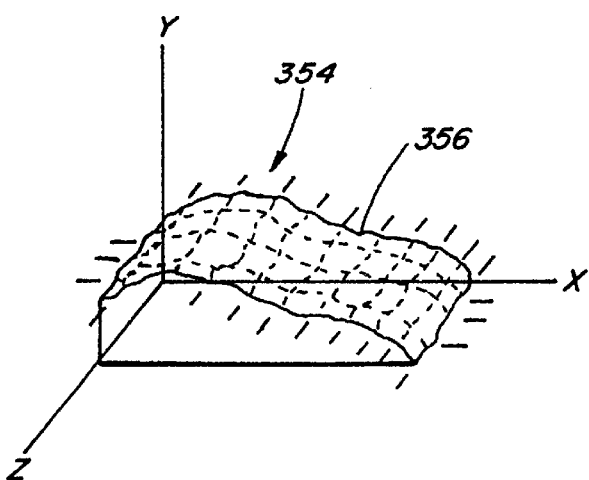
FIG. 9 is a graphical representation of the distribution of the soil within the truck bed shown in FIG. 8.
Figure 10:
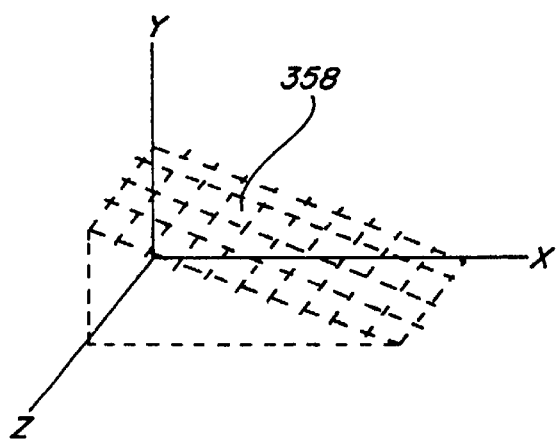
FIG. 10 is a refined graphical representation of the graphical representation shown in FIG. 9.

The load point planner 68 is used to plan where to unload a bucket of material in a dump truck or other receptacle. The load point planner 68 may take into account the shape of the material already in the truck or receptacle and the desired distribution of the material to determine the optimal location to deliver the next load. Additionally, it is desirable to load the truck evenly and completely. The perception algorithm processor 26 provides or constructs a load map corresponding to the load of material in the receptacle to data processing means associated with the loading point planner 68. Referring now to FIGS. 8–10, FIG. 8 in particular shows a dump truck bed 350, which may be part of the dump truck 206 (FIG. 4), having a load 352 of excavated material stored therein. The load point planner 68 employs a template-based approach to robustly find the low regions of soil distribution within the truck bed 350. A load map 354, which is illustrated in FIG. 9, corresponds to or is representative of the load 352 distributed within the truck bed 350 is typically acquired or constructed by using the sensor system 24. The load map 354 may include cells 356 and a typical load map 354 may contain on the order of 500 cells 356. The load map 354 is processed or smoothed using a simple Gaussian filter to eliminate any noise picked up by the sensor system 24. The smoothed load map appears as a template 358 which is shown in FIG. 10. The template 358 is an ideal distribution pattern of the material or soil distribution within the receptacle or dump truck bed 350. Various shapes may be chosen for template 358 and the height data may be preprogrammed in the digital computer or calculated interactively based on user input. The template 358 for the desired load distribution may also vary from a simple pattern to a more complex pattern. The template 358 is then used to determine where to dump a load of material to evenly load the dump truck bed 350.

Further, it is known that occlusion of the deposited soil within the dump truck bed 350 is a serious problem. In order to compensate for this problem and rather than assuming that there are no unseen regions within the truck bed 350, the load point planner 68 fills in any unknown cells 356 within the load map 354 with the average elevation of the known cells 356. This results in some slight inaccuracies in the perceived soil distribution at first, but this will diminish as more soil is placed in the truck bed 350 and the load map 354 is updated.

The loading motion planner 80 controls complex automated movement of the earthmoving machinery 22 using pre-stored instructions, including at least one parameter, that generally defines the complex automated movement. The loading motion planner 80 determines a value for each parameter during the execution of the pre-stored instructions and may include a learning algorithm which modifies the parameters based on the results of previous work cycles so that the performance of the earthmoving machine 22 more closely matches the desired results. Parameters are used as needed to define changes in the complex automated movement as a result of work that is done or changes in the earthmoving environment 26. For example, complex automated movement performed by the earthmoving machinery 22 can be affected by the movement, location, and orientation of objects around the machine. In addition, when the earthmoving machinery 22 is performing work which involves moving material from one location to another, either the starting position or the destination may change, requiring changes in the movement. The sensor system 24 which is mounted on the earthmoving machine 22 or at some location remote from the earthmoving machine 22 can be used to detect the starting and ending locations. The parameters in the instructions can be modified to maximize the efficiency of the complex automated movement. Parameters can be included in instructions, e.g., to determine when to begin movement of different linkages on the earthmoving machine 22 to obtain quick, efficient movement of the arm from when the material has been loaded until the material is deposited in the truck.

The planning and control module 30 determines the movements required by the earthmoving machinery 22 to accomplish designated tasks. In order to accomplish the tasks efficiently, the planning and control module 30 predetermines the response of the earthmoving machinery 22 to a given set of motion commands. The outputs of the planning and control module 30 may be sent to the machine controller interface 100 to drive one or more hydraulic pumps for moving the actuators 32 on the earthmoving machinery 22. When two or more actuators 32 are driven by a single hydraulic pump, there may not be adequate hydraulic pressure to drive all of the actuators 32 at the speed requested by the planning and control module 30. In order to determine the non-linear response of the actuators 32 and the optimal combination of motions of the moving parts driven by the actuators 32, a controller for the earthmoving machinery 22 is modeled as a linear dynamic system. The non-linear response of the actuators 32 may be modeled using a look-up table that is a function of internal variables of the actuators 32 and the hydraulic system. The number of input variables that are supplied to the look-up table is proportional to the number of the actuators 32 being driven by a single pump. The sensor system 24 provides data regarding the internal state of each of the actuators including variables such as spool valve position and cylinder force. These variables are used to index the tables containing data that represents a constraint surface associated with each of the actuators 32. The constraint surfaces are predetermined and are dependent on the state of the other actuators driven by the same pump.

The sensor-motion planner 78 has a motion script which can be used to guide the scan pattern and scan rate for the sensor system 24 as a function of the earthmoving machinery's 22 progress during the work cycle. The sensor motion planner 78 may send position and/or velocity commands to the sensor system 24. The sensor motion planner 78 may acquire information regarding the actual state of the sensor system 24 through a sensor interface, such as the left sensor interface 48 or the right sensor interface 50.

The obstacle detector 84 uses sensor data and a prediction of the earthmoving machinery's 22 future state to determine if there is an obstacle in the proposed path of motion. If there is, the obstacle detector 84 plans a path around the obstacle, executes the planned motion, and returns control to the planning and control module 30, such as performing a loading operation or an excavation operation. It is important for the sensor system 24 to scan far enough ahead of the earthmoving machinery's 22 motion, and for the prediction to be far enough in the future, for the earthmoving machinery 22 to have enough time and space to come to a complete stop or to move around the obstacle. The look-ahead distance is a function of the velocity of the earthmoving machinery 22. The prediction of the earthmoving machinery's 22 location is determined using simplified models of the earthmoving machinery's 22 closed loop dynamic behavior. The sensor system 24 provides the obstacle detector 84 with data concerning the earthmoving environment 26 in the form of range data. The range data is processed to create a grid based elevation map. The map is centered on the earthmoving machinery 22 and is constructed prior to each movement of the earthmoving machinery 22. Each grid within the elevation map contains the height of the highest data point that falls within the cell and the elevation map provides a conservative estimate of the height of the earthmoving environment 26 at any point near the earthmoving machinery 22.

Further, the obstacle detector 84 during each cycle, about every 100 milliseconds, determines the positions and velocities of various components associated with the earthmoving machinery 22, such as for example, the position and velocities of the bucket 324, the stick 326, and the boom 328 of the excavator 320 shown in FIG. 7. Once this information is collected, the obstacle detector 84 begins a simulation to predict the path of the various components. The obstacle detector 84 predicts the state of the earthmoving machinery 22 far enough in the future to detect any potential collision in order to halt the earthmoving machinery 22. The simulation speed is chosen so that when simulating movements of the components of the earthmoving machinery 22 the maximum angular velocity, approximately 50 degrees per second, the components of the earthmoving machinery 22 will move no more than the width of one grid cell in the elevation map. In a typical system 20, a simulation time step will take less than 0.1 milliseconds and the total computation time required for a simulation during each 100 millisecond cycle will be less than 2 milliseconds. At each simulation time step, a simple geometric representation of the components of the earthmoving machinery 22 is computed based on the predicted angles of the components. This geometric model consists of a series of points and each point is checked for collision with any obstacles by computing the grid cell which the point lies in and then comparing the height of the point to the height stored in the cell. If the point's height is less than the cell's height plus a safety buffer or amount the system 20 is informed of a potential collision and an emergency stop command is generated.

Predicting collisions requires that the elevation map contain data from the earthmoving environment 26 within which the earthmoving machinery 22 will be moving. To ensure this, the sensor system 24 must pan far enough in advance or look ahead so that the simulation process has enough information or data to halt the earthmoving machinery 22. There are two pan angles associated with the sensor system 24 involved in computing look ahead. The first pan angle which is the look ahead angle is the maximum angle which the sensor system 24 or the scanning sensors 40 and 42 need to be panned to during a given swing motion of the components of the earthmoving machinery 22. The second angle which is the trigger angle is the angle the scanning sensors 40 and 42 must reach before the swing motion of the components of the earthmoving machinery 22 begins. These angles may be computed off-line and may be stored in a lookup table. After the obstacle detector 84 determines the swing command, the obstacle detector 84 then determines the lookahead and trigger angles from the lookup table. The scanning sensors 40 and 42 being panning to the angles provided from the lookup table during a digging or dumping operation in order for the trigger angle to be reached before the digging or dumping operation is complete.

The obstacle detector 84 also determines whether an object or obstacle is unexpectedly approaching the earthmoving machinery 22. In order to accomplish this the obstacle detector 84 gathers range data from the sensor system 24 and prepares a temporary elevation map. The temporary elevation map holds recent range data and is periodically compared with an accumulated elevation map. Any increase in cell elevation can indicate the presence of a moving object and a decrease may indicate that the object or obstacle has changed position. The temporary elevation map contains data such as the height of each cell and a status flag which indicates special properties of the cell. The temporary map is initialized so that each cell's status flag is empty. As data from the sensor system 24 is received, the data points are checked against the temporary elevation map and interpolated points are computed if necessary. Each cell stores the heights of the highest two points which fall in the cell with the highest point being discarded to minimize the impact of false sensor readings. Whenever a data point lies within a cell the cell's status flag is changed to a set condition or an interpolated condition if the data points were interpolated and the cell was previously empty. Interpolated points are used to set a cell's height only if the cell was previously marked as being empty. A sensed or real data point will always override a cell's height which was based on interpolated data. This prevents occlusions from generating an interpolated cell height which is higher than a previous actual cell height. Each time a temporary map cell changes status from an empty condition to a set or interpolated condition, it is added to a list of modified cells. This provides for fast access to those cells that have been modified in order for those cells to be merged in the accumulated map.

The accumulated elevation map is incrementally built from the modified cells of the temporary map. Each modified cell in the temporary map is compared with the corresponding cell in the accumulated map to detect elevation changes and to update the accumulated map height. While it is possible to fill the entire temporary map before comparing it to the accumulated map this would result in a significant latency in detecting moving objects. Instead, the accumulated map is compared with small portions of the temporary map which has received data. This significantly reduces the latency and map updates occur every half second.

The machine controller interface 100 provides an interface between controllers operatively connected to movable components associated with the earthmoving machinery 22 and the planning and control module 30. The machine controller interface 100 translates commands expressed in radians, for example, to a form required by one or more of the controllers within the earthmoving machinery 22. Information regarding the actual state of the machine 22, including the position and velocity of movable components, cylinder pressures, and the position and orientation of the machine 22, may be sent from the sensors 40 and 42 on the earthmoving machinery 22 to the machine controller interface 100.

The planners, modules, or processors discussed hereinabove are illustrative of a preferred embodiment of the system 20 for autonomous control of the earthmoving machinery 22. Alternate earthmoving tasks may require one or more planners, modules, or processors in addition to or instead of those described hereinabove. The important aspect of the present invention is that it may be adapted to meet the specific requirements from many types of tasks and earthmoving machinery. Logic portions of the sensors 40 and 42, the perception algorithm processor 28, and the planning and control module 30 associated with the present invention, may be implemented in computer software, firmware, or hardware, or a combination thereof. Any suitable means for transferring data among the components may be used, such as a data bus, radio, satellite, infrared, or cable transmission and reception means.

Industrial Applicability

The above described invention is useful for automating earthmoving machinery 22 possessing a plurality of movable components, such as the hydraulic excavator 202 or the front wheel loader 220. In many situations, the earthmoving machinery 22 must perform rapidly under high loading conditions such as digging into a soil face. The present system 20 coordinates the sensor system 24 and the planning and control module 30 and allows for system 20 growth by using a modular structure that is capable of supporting additional sensor systems 24, perception algorithm processors 26, and planning and control modules 30. The present system 20 further does not require any prior knowledge of the earthmoving environment 26 because the sensor system 24 provides data from which knowledge of the position and dimensions of the loading receptacle, such as a dump truck or railroad car, and the location and shape of the material to excavated can be determined at the beginning and throughout the excavation process.

Examples of automated earthmoving machinery 22 according to the present invention are shown in FIG. 4 as an excavator 202 moving soil, stone, or other material from one location to another location, such as from the dig face 204 to the dump truck 206, and in FIG. 5 as the front wheel loader 220 moving material from the soil face 222 to the dump truck 224. As the material is moved, the position of movable components on the earthmoving machinery 22 such as the boom 200 and the bucket 208 on the excavator 202, and the bucket 232 on the front wheel loader 220 will change. In addition, dump trucks may vary in size, precise position, and orientation relative to the earthmoving machinery 22. All such changes are taken into account to maximize efficiency in transferring the material from the starting location to the loading receptacle with minimal spillage.

FIGS. 4 and 5 illustrate typical excavation sites. In order for the excavator 202 and the wheel loader 220 to operate autonomously, the location of objects and obstacles within their area of movement, and the location of terrain to be excavated must be known. The sensor system 24 must therefore be capable of providing current information regarding location of objects around the area of movement far enough in advance to provide the excavator 202 and the wheel loader 220 with adequate response time.

The application of the present invention to excavators 202 and wheel loaders 220 for excavating and loading operations is illustrative of the utility of the present invention. There are many other applications wherein the system 20 may be incorporated such as fork trucks, mining equipment, construction equipment, and agricultural equipment.

Other aspects, objects and advantages of the present invention can be obtained from a study of the drawings, the disclosure and the appended claims.

What is claimed is:

1. A system for autonomous control of an earthmoving machine within an earthmoving environment, the system comprising:

an earthmoving machine equipped with a scanning sensor system operable to provide data corresponding to regions within the earthmoving environment including an excavation region and a loading region; and a planning and control module operable to receive data from the scanning sensor system to plan a task associated with control of the earthmoving machine in the excavation region while concurrently performing another task associated with the control of the earthmoving machine within the loading region.

2. The system of claim 1 wherein the scanning sensor system comprises a laser rangefinder which is capable of movement about an axis in order to scan the earthmoving environment.

3. The system of claim 2 wherein the scanning sensor system further comprises another laser rangefinder which is capable of movement about an axis in order to scan the earthmoving environment.

4. The system of claim 1 wherein the scanning sensor system comprises a radar rangefinder which is capable of movement about an axis in order to scan the earthmoving environment.

5. The system of claim 4 wherein the scanning sensor system further comprises another radar rangefinder which is capable of movement about an axis in order to scan the earthmoving environment.

6. The system of claim 1 further comprising an obstacle detector for detecting the presence of an obstacle within the earthmoving environment.

7. The system of claim 6 wherein the obstacle detector produces a signal representative of an obstacle being detected within the earthmoving environment and a signal for halting operation of the earthmoving environment.

8. The system of claim 1 wherein the planning and control module is operable to select a starting location within the earthmoving environment to begin control of the earthmoving machine in the excavation region.

9. The system of claim 1 wherein the planning and control module is operable to determine a position and orientation of a loading receptacle, and to determine a location in the loading receptacle in which to place excavated material.

10. The system of claim 1 wherein the planning and control module is operable to generate commands for controlling operation of the scanning sensor system.

11. The system of claim 1 further comprising a machine controller interface operable to receive a command from the planning and control module and to transmit the command to the earthmoving machine to control operation of the earthmoving machine.

12. The system of claim 1 further comprising a position system operable to transmit data regarding a position of the earthmoving machine within the earthmoving environment.

13. A system for autonomous control of earthmoving machinery, the system comprising:

an earthmoving machine equipped with a scanning sensor system operable to provide data corresponding to regions within an earthmoving environment including an excavation region and a loading region;

a planning and control module operable to receive data from the scanning sensor system to plan a task associated with control of the earthmoving machine in the excavation region while concurrently performing another task associated with the control of the earthmoving machine within the loading region; and an obstacle detector for detecting the presence of an obstacle within the earthmoving environment and for generating a signal to halt operation of the earthmoving machine once the obstacle has been detected.

14. The system of claim 13 wherein the scanning sensor system comprises a laser rangefinder which is capable of movement about an axis in order to scan the earthmoving environment.

15. The system of claim 14 wherein the scanning sensor system further comprises another laser rangefinder which is capable of movement about an axis in order to scan the earthmoving environment.

16. The system of claim 13 wherein the scanning sensor system comprises a radar rangefinder which is capable of movement about an axis in order to scan the earthmoving environment.

17. The system of claim 16 wherein the scanning sensor system further comprises another radar rangefinder which is capable of movement about an axis in order to scan the earthmoving environment.

18. The system of claim 13 wherein the planning and control module is operable to select a starting location within the earthmoving environment to begin control of the earthmoving machine in the excavation region.

19. The system of claim 13 wherein the planning and control module is operable to determine a position and orientation of a loading receptacle, and to determine a location in the loading receptacle in which to place excavated material.

20. A system for autonomous control of earthmoving machinery, the system comprising:

an earthmoving machine equipped with a scanning sensor system operable to provide data corresponding to regions within an earthmoving environment including an excavation region and a loading region, the scanning sensor system comprising a first sensor being operable to rotate to scan a field of view greater than zero degrees in a first plane around the earthmoving machine and a second sensor being operable to rotate to scan a field of view greater than zero degrees in a second plane around the earthmoving machine, the sensors being positioned on the earthmoving machine and having independently adjustable fields of view and scan patterns to provide range data for different areas of the earthmoving environment for planning and executing at least one earthmoving task; and an obstacle detector operable to receive data from the scanning sensor system to determine if an object is present within the earthmoving environment and once an obstacle has been detected for halting operation of the earthmoving machine.

21. The system of claim 20 wherein the obstacle detector produces a map representative of the earthmoving environment and a temporary map representative of a particular region within the earthmoving environment and the obstacle detector compares the two maps to determine if there are any changes between the two maps.

22. The system of claim 20 wherein the first and second planes are vertical planes.

* * * * *